(12) United States Patent
Saito (10) Patent No.: US 11,506,134 B1
(45) Date of Patent: Nov. 22, 2022

(54) CONTROL APPARATUS FOR ELECTRIC VEHICLE

(71) Applicant: MAZDA MOTOR CORPORATION, Hiroshima (JP)

(72) Inventor: Hiroyuki Saito, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/738,215

(22) Filed: May 6, 2022

(30) Foreign Application Priority Data

May 31, 2021 (JP) .............................. JP2021-091094

(51) Int. Cl.
| | | |
|---|---|---|
| *F02D 13/02* | (2006.01) | |
| *F01L 1/34* | (2006.01) | |
| *F02B 53/04* | (2006.01) | |
| *F02B 53/02* | (2006.01) | |
| *F02B 53/00* | (2006.01) | |

(52) U.S. Cl.
CPC ............ *F02D 13/0234* (2013.01); *F01L 1/34* (2013.01); *F02B 53/02* (2013.01); *F02B 53/04* (2013.01); *F02D 13/0238* (2013.01); *F01L 2201/00* (2013.01); *F01L 2800/00* (2013.01); *F02B 2053/005* (2013.01); *F02D 2200/0411* (2013.01); *F02D 2200/101* (2013.01); *F02D 2400/02* (2013.01)

(58) Field of Classification Search
CPC .. F01L 1/34; F02B 53/02; F02B 53/04; F02B 2053/005; F02D 13/0234; F02D 13/0238; F02D 2200/0411; F02D 2200/101

USPC ... 123/90.15–90.18, 339.14, 339.18, 339.19, 123/339.2, 339.21
See application file for complete search history.

(56) References Cited

U.S. PATENT DOCUMENTS

| | | | | |
|---|---|---|---|---|
| 3,978,826 | A * | 9/1976 | Gavrun | ............... F02D 13/0269 123/90.15 |
| 6,109,237 | A * | 8/2000 | Pels | ...................... B60W 10/08 123/339.11 |
| 2007/0068478 | A1* | 3/2007 | Zillmer | ................. F02D 31/003 123/192.1 |
| 2011/0137504 | A1* | 6/2011 | Nakamura | ............ F01L 1/3442 180/65.265 |

(Continued)

FOREIGN PATENT DOCUMENTS

| | | |
|---|---|---|
| JP | H05-272364 A | 10/1993 |
| JP | 2020-084933 A | 6/2020 |

*Primary Examiner* — Erick R Solis
(74) *Attorney, Agent, or Firm* — Studebaker & Brackett PC (57) ABSTRACT

Closing timing of an intake port is changed without using a variable valve timing mechanism. An electric vehicle includes an engine for electricity generation in which closing timing of an intake port maximizes intake air charging efficiency in a specific revolution speed region, a sensor which outputs a signal related to a revolution speed of the engine, a controller which drives the engine at a revolution speed based on the signal of the sensor, a requested electricity generation amount being satisfied at the revolution speed, and a motor which applies a positive or negative torque to the engine. When the engine is driven in a revolution speed region other than the specific revolution speed region, the controller uses the motor to apply a positive or negative torque to the engine in an intake stroke to change the closing timing of the intake port to increase intake air charging efficiency.

8 Claims, 10 Drawing Sheets

(56) References Cited

U.S. PATENT DOCUMENTS

| | | | |
|---|---|---|---|
| 2016/0160775 A1* | 6/2016 | Endo | F02D 13/0234 |
| | | | 701/113 |
| 2020/0164764 A1* | 5/2020 | Son | B60L 50/61 |
| 2022/0065187 A1* | 3/2022 | Sugimoto | F02D 31/007 |

\* cited by examiner

CONTROL APPARATUS FOR ELECTRIC VEHICLE

TECHNICAL FIELD

The technique disclosed herein relates to a control apparatus for an electric vehicle.

BACKGROUND ART

Japanese Patent Laid-Open No. 5-272364 discloses a reciprocating engine. This reciprocating engine includes a variable valve timing mechanism which changes a closing timing of an intake valve. The variable valve timing mechanism changes the closing timing of the intake valve in accordance with a driving state of the engine.

Japanese Patent Laid-Open No. 2020-84933 discloses a rotary engine. Intake ports of the rotary engine open in a side housing. The rotary engine has two intake ports which are a first intake port and a second intake port. The first intake port and the second intake port are disposed to neighbor each other in a revolution direction of a rotor. The first intake port closes at a relatively early timing, and the second intake port closes at a relatively late timing.

SUMMARY

An electric vehicle has been known in which an engine for charging a battery is installed. When a state of charge (SOC) of the battery lowers, the engine is driven for electricity generation. In accordance with the SOC of the battery, a requested electricity generation amount changes. A driving revolution speed of the engine changes in accordance with the requested electricity generation amount.

In accordance with the driving revolution speed of the engine, a closing timing of an intake port at which intake air charging efficiency becomes a maximum changes. A variable valve timing mechanism can in general change the closing timing of the intake port such that the intake air charging efficiency becomes the maximum. However, depending on a layout of the engine or a type of the engine, there may be a case where the closing timing of the intake port cannot be changed by using the variable valve timing mechanism. As one example, the variable valve timing mechanism cannot be mounted on a rotary engine due to its structure. It is difficult to change the closing timing of the intake port in a rotary engine.

The technique disclosed herein changes the closing timing of the intake port without using a variable valve timing mechanism.

The technique disclosed herein relates to a control apparatus for an electric vehicle. The control apparatus for an electric vehicle includes:

an engine which is for electricity generation and in which a closing timing of an intake port is set such that intake air charging efficiency becomes a maximum in a specific revolution speed region;

a sensor which outputs an electric signal related to a revolution speed of the engine;

a controller which drives the engine at a revolution speed based on the electric signal of the sensor, a requested electricity generation amount being satisfied at the revolution speed; and a motor which applies a positive torque or a negative torque to the engine, and when the engine is driven in a revolution speed region other than the specific revolution speed region, the controller uses the motor to apply a positive torque or a negative torque to the engine in an intake stroke such that the closing timing of the intake port is changed in a direction in which the intake air charging efficiency becomes high.

With this configuration, when the engine is driven in a revolution speed region other than the specific revolution speed region, the controller applies a positive torque or a negative torque to the engine in the intake stroke. Accordingly, a revolution rate of the engine is temporarily changed. Because the rate is changed temporarily, the revolution speed of the engine is substantially constant, and an intake air flow speed is maintained to be constant. Meanwhile, the intake stroke becomes shorter or longer. When the intake stroke becomes shorter or longer, the intake air charging efficiency is changed. This engine can change the intake air charging efficiency by changing the closing timing of the intake port without using a variable valve timing mechanism.

The controller uses the motor to apply a positive torque or a negative torque to the engine such that the closing timing of the intake port is changed in the direction in which the intake air charging efficiency becomes high. The intake air charging efficiency of the engine becomes high through a wide revolution speed region. This configuration is advantageous in an improvement in fuel efficiency performance of the engine.

Note that because the engine is an engine for electricity generation and does not produce motive power for traveling of the vehicle, a change in the revolution rate of the engine in the intake stroke is permitted.

The motor may be an assist motor which is connected with a shaft of the engine, and the controller may use the assist motor to apply a positive torque or a negative torque to the engine in the intake stroke.

Because the assist motor applies a torque to the engine, driving of an electrical generator driven by the engine is not influenced by torque application. The electrical generator can efficiently perform electricity generation driving.

The motor may be a generator motor which is mechanically connected with the engine and is driven by the engine, and the controller may cause the generator motor to perform electricity generation driving such that a torque lower than an electricity generation torque corresponding to the requested electricity generation amount is applied to the engine in the intake stroke.

In this configuration, a temporary negative torque can be applied to the engine by using the generator motor. Because the generator motor is used, this configuration does not need an additional device.

The closing timing of the intake port may be a timing at which the intake air charging efficiency becomes a maximum at a highest use revolution speed of the engine.

With this configuration, in a case where the revolution speed of the engine is lower than the highest use revolution speed, the motor performs power and thereby applies a temporary positive torque to the engine. Accordingly, the closing timing of the intake port becomes earlier, and the intake air charging efficiency of the engine can be made higher in accordance with the revolution speed of the engine.

The closing timing of the intake port may be a timing at which the intake air charging efficiency becomes a maximum in a revolution speed region in which a use frequency of the engine is highest.

With this configuration, when the revolution speed of the engine is lower than the revolution speed region in which the use frequency of the engine is highest, the motor applies a temporary negative torque to the engine. When the revolution speed of the engine is higher than the revolution speed region in which the use frequency of the engine is highest, the motor applies a temporary positive torque to the engine.

In this configuration, because torque application to the engine is not performed in a case where the revolution speed of the engine is in the revolution speed region in which the use frequency is highest, a frequency of application of a positive torque or a negative torque by the motor becomes low.

As described above, a control apparatus for an electric vehicle can change a closing timing of an intake port without using a variable valve timing mechanism.

DETAILED DESCRIPTION

An embodiment of a control apparatus for an electric vehicle will hereinafter be described with reference to the drawings. The control device for an electric vehicle will be described herein as an example.

Figure 1:
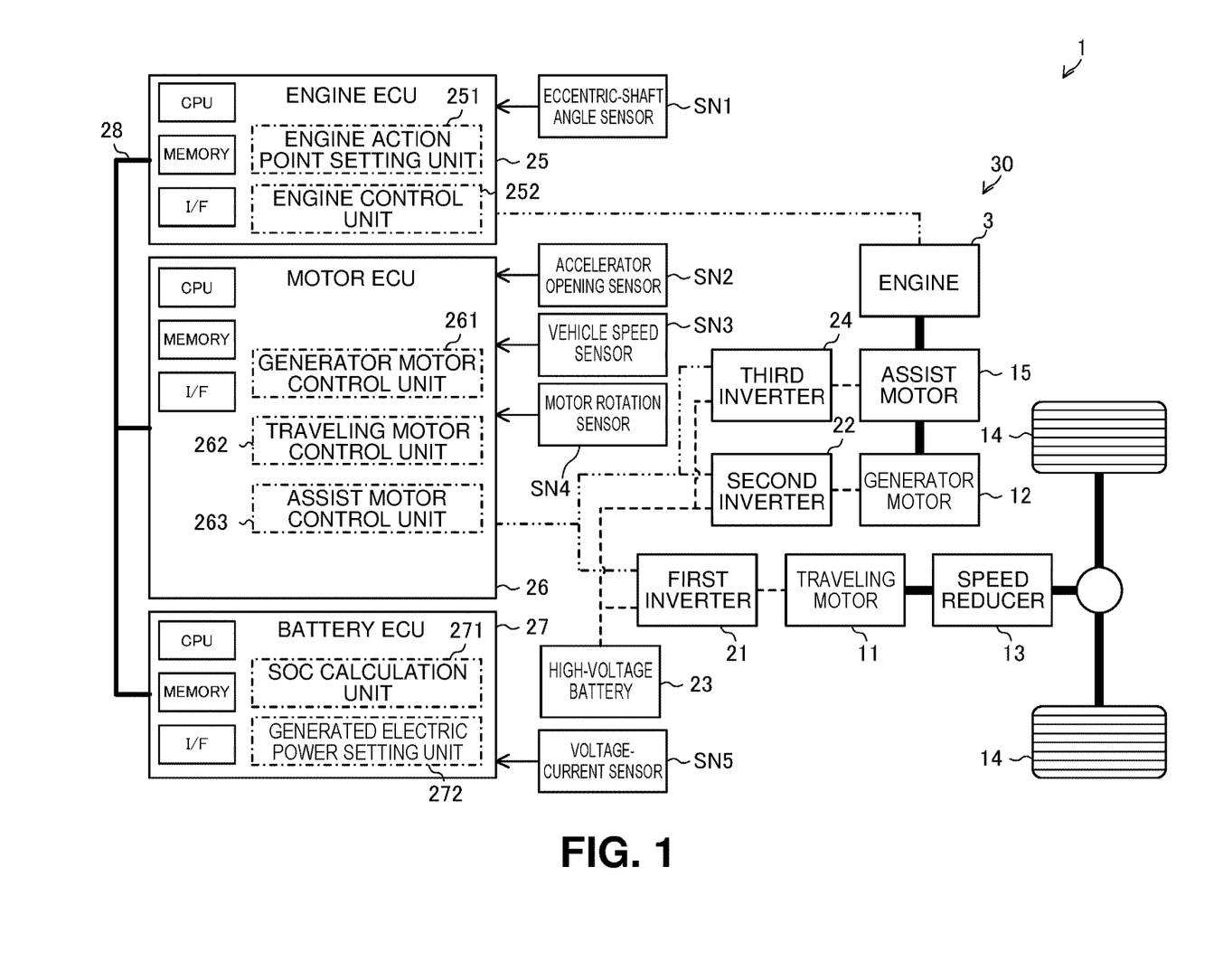
FIG. 1 illustrates an example control system of an electric vehicle.

General Configuration of Electric Vehicle FIG. 1 illustrates a control system of an electric vehicle. An electric vehicle 1 includes a traveling motor 11 for traveling. The traveling motor 11 is mechanically connected with drive wheels 14 and 14 via a speed reducer 13. The speed reducer 13 reduces a speed of an output of the traveling motor 11. When the output of the traveling motor 11 is transmitted to the drive wheels 14 and 14, the electric vehicle 1 travels.

The electric vehicle 1 includes a high-voltage battery 23. The high-voltage battery 23 accumulates electric power for traveling. The high-voltage battery 23 is a lithium-ion battery, for example.

The traveling motor 11 is electrically connected with the high-voltage battery 23 via a first inverter 21. The traveling motor 11 and the first inverter 21 are electrically connected together via a harness line indicated by a broken line in FIG. 1, and the first inverter 21 and the high-voltage battery 23 are electrically connected together via a harness line. The traveling motor 11 performs power running by being supplied with electric power from the high-voltage battery 23. The traveling motor 11 also performs electricity generation driving when the electric vehicle 1 decelerates. The first inverter 21 supplies regenerative electric power of the traveling motor 11 to the high-voltage battery 23. The high-voltage battery 23 is charged by the regenerative electric power of the traveling motor 11.

A range extender device 30 is installed in the electric vehicle 1. The range extender device 30 includes a generator motor 12 for electricity generation and an internal combustion engine which drives the generator motor 12. In the electric vehicle 1 raised here as an example, the internal combustion engine is a rotary engine 3.

A shaft of the rotary engine 3 is mechanically connected with the generator motor 12. When the rotary engine 3 is driven, the generator motor 12 performs electricity generation driving. Note that a configuration of the rotary engine 3 will later be described in detail.

The generator motor 12 is connected with the high-voltage battery 23 via a second inverter 22. The generator motor 12 and the second inverter 22 are electrically connected together via a harness line indicated by a broken line in FIG. 1, and the second inverter 22 and the high-voltage battery 23 are electrically connected together via a harness line. The second inverter 22 supplies electric power generated by the generator motor 12 to the high-voltage battery 23. The high-voltage battery 23 is charged by the electric power generated by the generator motor 12. Note that as described later, there may be a case where the generator motor 12 performs power running by being supplied with electric power from the high-voltage battery 23. The generator motor 12 also functions as a starter. The generator motor 12 starts the rotary engine 3 by applying a cranking torque to the rotary engine 3.

An assist motor 15 is also mechanically connected with the rotary engine 3. The assist motor 15 can apply a positive torque or a negative torque to the rotary engine 3. As described later, the assist motor 15 temporarily applies a positive torque or a negative torque to the rotary engine 3. A revolution rate of the rotary engine 3, to which the positive torque or the negative torque is applied, temporarily changes.

In the configuration example in FIG. 1, the assist motor 15 is provided between the rotary engine 3 and the generator motor 12. As an example of connection among the rotary engine 3, the generator motor 12, and the assist motor 15, a planetary gear mechanism may be employed. For example, the rotary engine 3 may be connected with a carrier of the planetary gear mechanism, the generator motor 12 may be connected with a ring gear of the planetary gear mechanism, and the assist motor 15 may be connected with a sun gear of the planetary gear mechanism. The planetary gear mechanism and the assist motor 15 can be built in the shaft which connects the rotary engine 3 and the generator motor 12 together.

When the planetary gear mechanism is employed, turning ON and OFF of a torque assist by the assist motor 15 can be performed with high responsiveness. Temporary application of a positive torque or a negative torque to the rotary engine 3 is realized. Furthermore, the planetary gear mechanism is employed, and the torque assist can thereby be switched ON and OFF without consuming energy. This configuration is advantageous in an improvement in electricity efficiency performance of the electric vehicle 1.

Note that the connection among the rotary engine 3, the generator motor 12, and the assist motor 15 is not limited to a configuration using a planetary gear mechanism.

The assist motor 15 is connected with the high-voltage battery 23 via a third inverter 24. The assist motor 15 and the third inverter 24 are electrically connected together via a harness line indicated by a broken line in FIG. 1, and the third inverter 24 and the high-voltage battery 23 are electrically connected together via a harness line.

The electric vehicle 1 includes an engine ECU (electric control unit) 25, a motor ECU 26, and a battery ECU 27. Each of the engine ECU 25, the motor ECU 26, and the battery ECU 27 is a controller based on a known microcomputer. Each of the ECUs includes a central processing unit (CPU), a memory, and an OF circuit. The CPU executes programs. The memory is configured with a RAM (random access memory) and a ROM (read-only memory), for example. The memory stores programs and data. The I/F circuit inputs and outputs electric signals.

The engine ECU 25, the motor ECU 26, and the battery ECU 27 are connected with each other via a CAN (car area network) communication line 28. The engine ECU 25, the motor ECU 26, and the battery ECU 27 can mutually transmit and receive signals via the CAN communication line 28.

The engine ECU 25 is electrically connected with the rotary engine 3 via a signal line indicated by a two-dot chain line. The engine ECU 25 controls the rotary engine 3. An eccentric-shaft angle sensor SN1 is connected with the engine ECU 25. The eccentric-shaft angle sensor SN1 outputs a signal related to rotation of an eccentric shaft 35 as an output shaft of the rotary engine 3. The engine ECU 25 can acquire information about a revolution position of the rotary engine 3 based on the signal of the eccentric-shaft angle sensor SN1.

The engine ECU 25 has, as function blocks, an engine operating point setting unit 251 and an engine control unit 252. Details of control of the rotary engine 3 by the engine ECU 25 will be described later.

The motor ECU 26 is electrically connected with the first inverter 21, the second inverter 22, and the third inverter 24 via signal lines indicated by two-dot chain lines. The motor ECU 26 controls the traveling motor 11 through the first inverter 21. The motor ECU 26 controls the generator motor 12 through the second inverter 22. The motor ECU 26 controls the assist motor 15 through the third inverter 24.

An accelerator opening sensor SN2, a vehicle speed sensor SN3, and a motor rotation sensor SN4 are connected with the motor ECU 26. The accelerator opening sensor SN2 outputs a signal corresponding to a depression amount of an accelerator pedal to the motor ECU 26. The vehicle speed sensor SN3 outputs a signal corresponding to a speed of the electric vehicle 1 to the motor ECU 26.

The motor rotation sensor SN4 outputs a signal related to rotation of the generator motor 12 to the motor ECU 26. The motor ECU 26 can recognize a rotation angle of the eccentric shaft 35 of the rotary engine 3, with which the generator motor 12 is mechanically connected, based on the signal of the motor rotation sensor SN4.

The motor rotation sensor SN4 also outputs signals related to rotations of the traveling motor 11 and the assist motor 15 to the motor ECU 26.

The motor ECU 26 has, as function blocks, a generator motor control unit 261, a traveling motor control unit 262, and an assist motor control unit 263. Details of control of the generator motor 12 by the generator motor control unit 261 will be described later. Further, details of control of the assist motor 15 by the assist motor control unit 263 will be described later.

The traveling motor control unit 262 controls the traveling motor 11 based on the signals of the accelerator opening sensor SN2, the vehicle speed sensor SN3, and the motor rotation sensor SN4. Accordingly, the electric vehicle 1 performs acceleration or deceleration corresponding to a manipulation of the accelerator pedal by a driver.

A voltage-current sensor SN5 is connected with the battery ECU 27. The voltage-current sensor SN5 outputs a signal related to an output voltage and an output current of the high-voltage battery 23 to the battery ECU 27. The battery ECU 27 has, as function blocks, an SOC calculation unit 271 and a generated electric power calculation unit 272. The SOC calculation unit 271 calculates an SOC (state of charge) of the high-voltage battery 23 based on the signal from the voltage-current sensor SN5. In a case where charging for the high-voltage battery 23 is necessary, the generated electric power calculation unit 272 calculates a target electricity generation amount based on the SOC of the high-voltage battery 23.

Configuration of Rotary Engine

Figure 2:
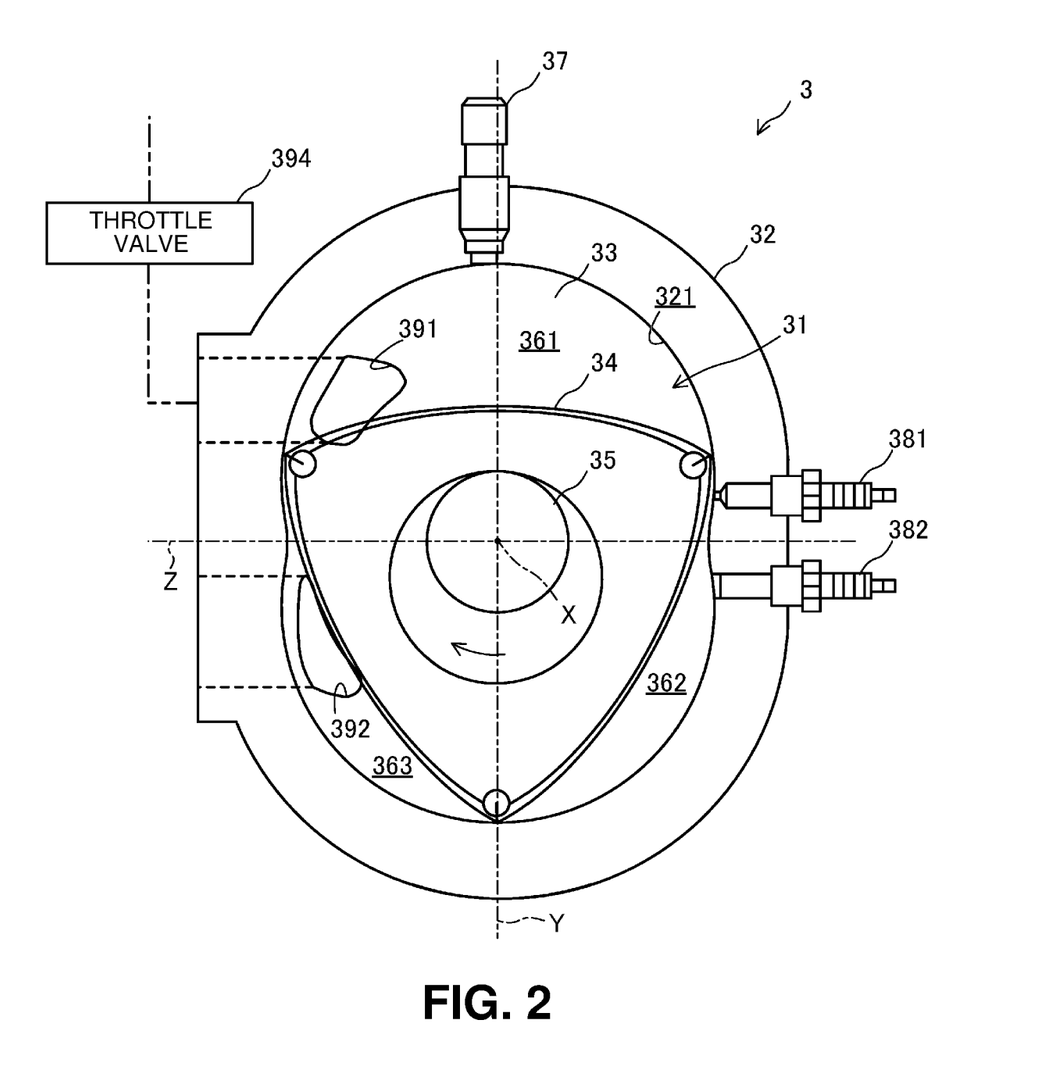
FIG. 2 illustrates an example rotary engine.

FIG. 2 illustrates the rotary engine 3 as an example. FIG. 2 illustrates, as an example, an internal configuration of the rotary engine 3 as seen from front. A front-rear direction of the rotary engine 3 corresponds to an axial direction of the eccentric shaft 35 and a direction orthogonal to the page of FIG. 2.

The rotary engine 3 has one rotor 34 and a rotor housing chamber 31. The rotor housing chamber 31 is formed with a rotor housing 32 and a side housing 33. The rotor housing 32 has a trochoidal inner peripheral surface 321. The rotor 34 is housed in the rotor housing chamber 31. The rotor 34 has a nearly triangular shape. The rotor housing chamber 31 is demarcated into three operation chambers of a first chamber 361, a second chamber 362, and a third chamber 363.

The eccentric shaft 35 is provided to pass through the rotor housing chamber 31. The rotor 34 is supported to perform planetary revolution motion with respect to the eccentric shaft 35. The rotor 34 revolves around the eccentric shaft 35 such that three top portions move along the trochoidal inner peripheral surface 321.

In response to revolution of the rotor 34 which is indicated by an arrow in FIG. 2, the first chamber 361, the second chamber 362, and the third chamber 363 are displaced around the eccentric shaft 35, and strokes of intake, compression, expansion, and exhaust are performed in each of the first chamber 361, the second chamber 362, and the third chamber 363. A rotational force produced by this is output from the eccentric shaft 35.

More specifically, the rotor 34 revolves in a clockwise direction in FIG. 2. The rotor housing chamber 31 can be divided into a left-upper region, a right-upper region, a right-lower region, and a left-lower region by a major axis Y and a minor axis Z which pass through a rotation axis X. Each of the operation chambers mostly performs an intake stroke in the left-upper region, mostly performs a compression stroke in the right-upper region, mostly performs an expansion stroke in the right-lower region, and mostly performs an exhaust stroke in the left-lower region.

An injector 37, a first spark plug 381, and a second spark plug 382 are mounted on the rotor housing 32. The injector 37 is mounted on a top portion of the rotor housing 32. The injector 37 injects fuel into the operation chamber in the intake stroke or in the compression stroke.

The first spark plug 381 is mounted on a right side wall portion of the rotor housing 32. The second spark plug 382 is also mounted on the right side wall portion of the rotor housing 32. The second spark plug 382 is positioned on an advancing side of the rotor 34 relative to the first spark plug 381. Each of the first spark plug 381 and the second spark plug 382 ignites air-fuel mixture in the operation chamber in the compression stroke.

In the side housing 33, an intake port 391 and an exhaust port 392 open. An opening of the intake port 391 is positioned in the left-upper region of the rotor housing chamber 31. The intake port 391 generally linearly extends, in an internal portion of the side housing 33, from this opening toward a left side in a horizontal direction. The opening of the intake port 391 opens and closes in response to revolution of the rotor 34. The intake port 391 communicates with the operation chamber in the intake stroke. The intake port 391 is connected with an intake passage. A throttle valve 394 is disposed in the intake passage. The throttle valve 394 is a throttling valve which adjusts an air amount to be supplied to the rotary engine 3.

An opening of the exhaust port 392 is positioned in the left-lower region of the rotor housing chamber 31. The opening of the exhaust port 392 is positioned below the opening of the intake port 391. The exhaust port 392 generally linearly extends, in an internal portion of the side housing 33, from this opening toward a left side in the horizontal direction. The opening of the exhaust port 392 opens and closes in response to revolution of the rotor 34. The exhaust port 392 communicates with the operation chamber in the exhaust stroke.

Figure 3:
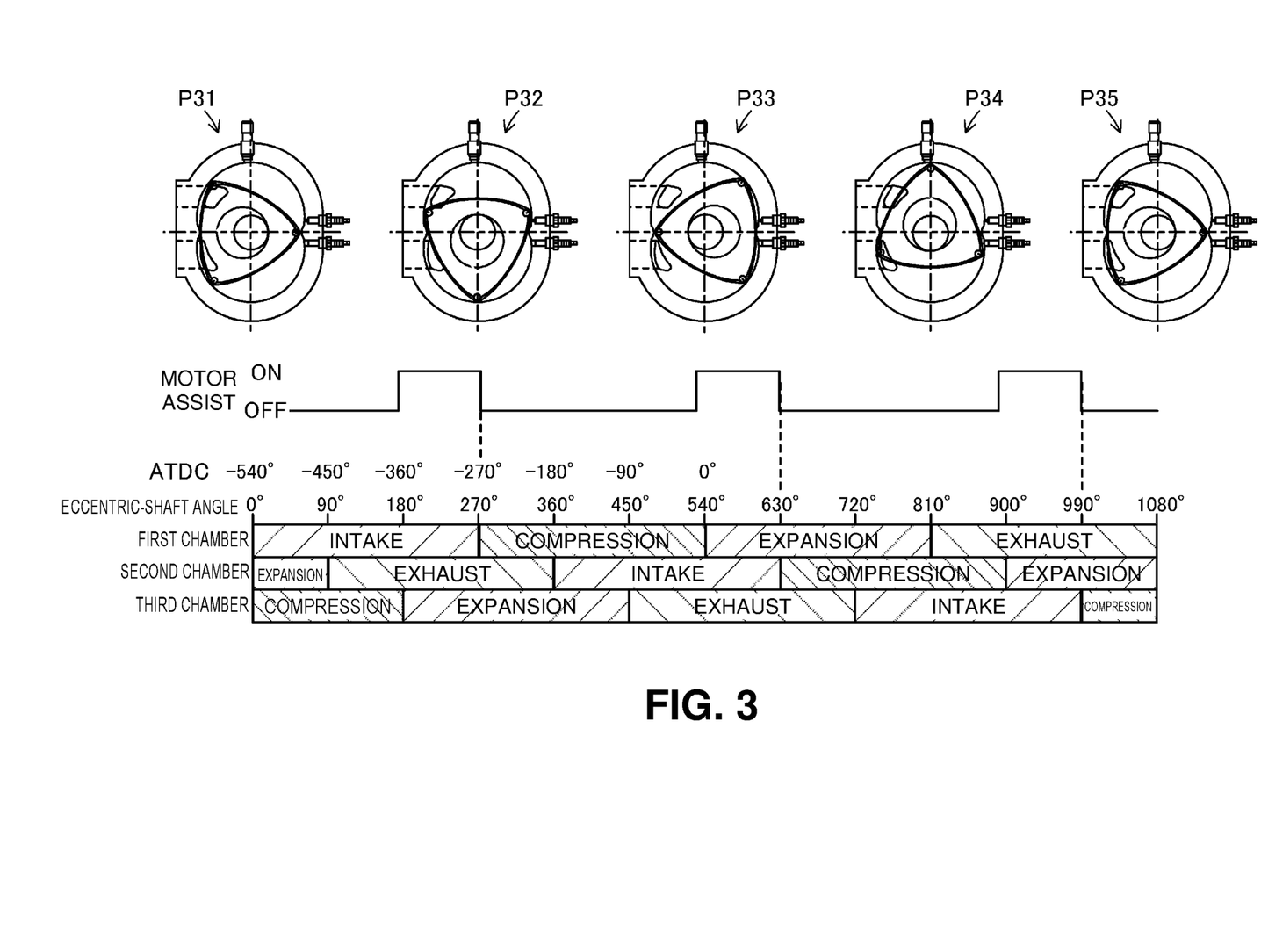
FIG. 3 illustrates an example timing chart about a motor assist.

FIG. 3 illustrates transition in strokes of each of the operation chambers of the rotary engine 3. One stroke of one operation chamber corresponds to a period in which the eccentric shaft 35 rotates by 270 ddeg. A reference character P31 denotes the rotary engine 3 which corresponds to a start timing of the intake stroke by the first chamber. A reference character P32 denotes the rotary engine 3 which corresponds to a finishing timing of the intake stroke and a start timing of the compression stroke by the first chamber. A reference character P33 denotes the rotary engine 3 which corresponds to a finishing timing of the compression stroke and a start timing of the expansion stroke by the first chamber. A reference character P33 denotes a compression top dead center of the first chamber. A reference character P34 denotes the rotary engine 3 which corresponds to a finishing timing of the expansion stroke and a start timing of the exhaust stroke by the first chamber. A reference character P35 denotes the rotary engine 3 which corresponds to a finishing timing of the exhaust stroke by the first chamber. The reference character P35 denotes the same state as the reference character P31.

One cycle which includes the intake stroke, compression stroke, expansion stroke, and exhaust stroke of one operation chamber corresponds to a period in which the eccentric shaft 35 rotates by 1080 deg. Further, phases of the second chamber 362 are delayed by 360 deg with respect to the first chamber 361. Phases of the third chamber are delayed by 360 deg with respect to the second chamber 362.

Note that the intake stroke, compression stroke, expansion stroke, and exhaust stroke which are illustrated in FIG. 3 are set in accordance with the rotation angle of the eccentric shaft 35 while the eccentric-shaft angle at the compression top dead center at which the volume of the operation chamber becomes smallest is used as a reference. Periods of the intake strokes which are indicated in FIG. 3 do not necessarily agree with opening and closing timings of the intake port 391. Similarly, periods of the exhaust strokes which are indicated in FIG. 3 do not necessarily agree with opening and closing timings of the exhaust port 392.

As described later, the opening and closing timings of the intake port 391 are set such that intake air charging efficiency becomes a maximum at the highest use revolution speed of the rotary engine 3 for electricity generation. Alternatively, the opening and closing timings of the intake port 391 are set such that the intake air charging efficiency becomes the maximum at the revolution speed at which a use frequency of the rotary engine 3 for electricity generation becomes highest. The opening and closing timings of the intake port 391 is defined in accordance with the shape of the opening of the intake port 391.

Electricity Generation Control in Electric Vehicle

Figure 4:
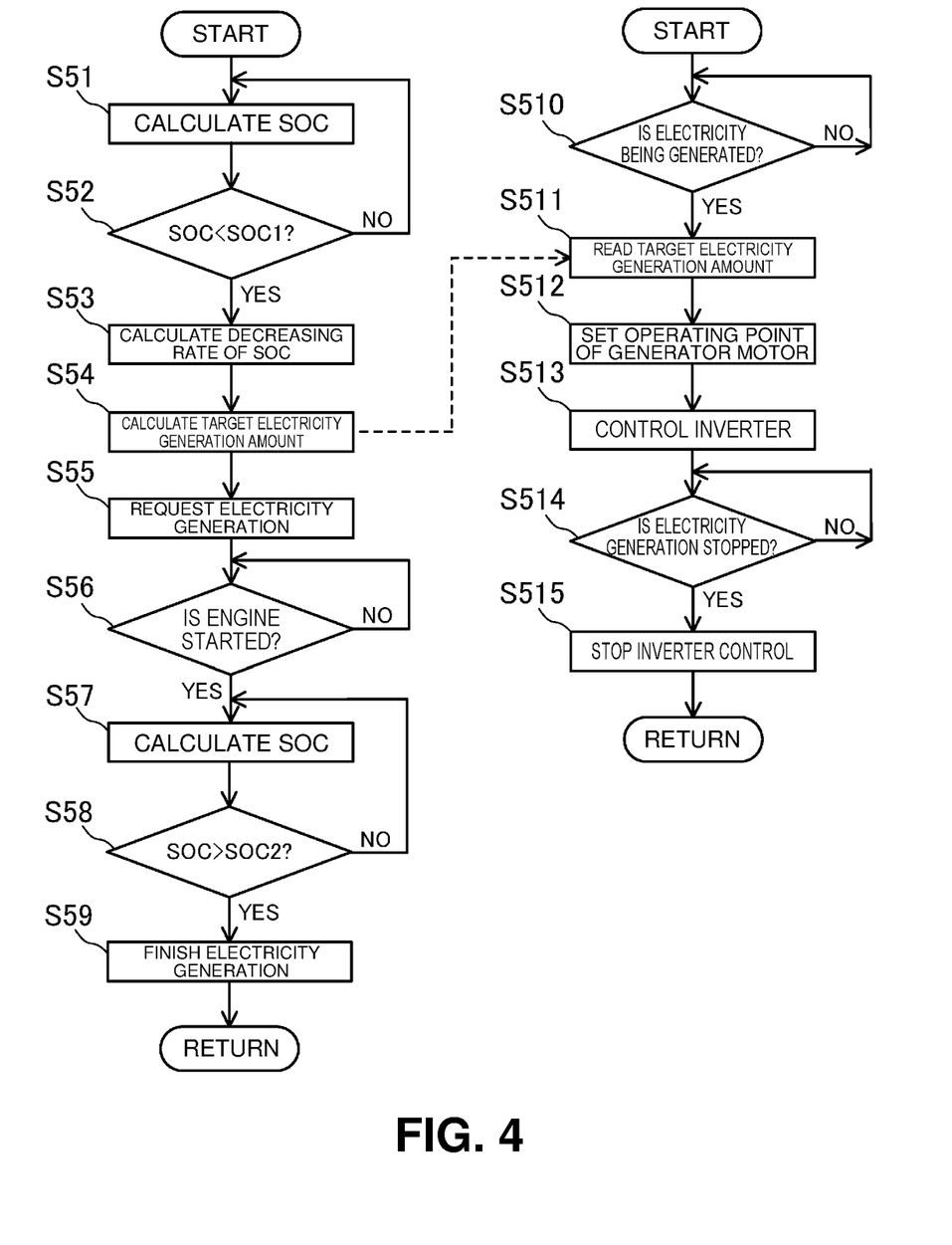
FIG. 4 illustrates an example procedure of battery management and an example procedure of motor control.

Next, electricity generation control in the electric vehicle 1 will be described with reference to FIG. 4 and FIG. 5. First, the left flowchart in FIG. 4 illustrates a management procedure of the high-voltage battery 23 which is executed by the battery ECU 27.

First, in step S51 after a start, the SOC calculation unit 271 of the battery ECU 27 calculates the SOC of the high-voltage battery 23 based on the signal from the voltage-current sensor SN5. In next step S52, the battery ECU 27 determines whether or not the calculated SOC is less than a first reference SOC1. In a case where the determination in step S52 is YES, the process progresses to S53. The battery ECU 27 determines that charging for the high-voltage battery 23 is necessary. In a case where the determination in step S52 is NO, the process returns to S51.

In step S53, the battery ECU 27 calculates a decreasing rate of the SOC, and in next step S54, the generated electric power calculation unit 272 of the battery ECU 27 calculates a target electricity generation amount in accordance with the calculated decreasing rate of the SOC. The battery ECU 27 makes the target electricity generation amount larger as the decreasing rate is higher.

When the target electricity generation amount is calculated, in step S55, the battery ECU 27 outputs an electricity generation request to each of the engine ECU 25 and the motor ECU 26 through the CAN communication line 28.

In step S56, the battery ECU 27 determines whether or not the rotary engine 3 is started based on information from the engine ECU 25. Until a start of the rotary engine 3 is completed, step S56 is repeated in the process, and when the start of the rotary engine 3 is completed, the process progresses to step S57.

When the rotary engine 3 is started and electricity generation by the generator motor 12 is started, in step S57, the SOC calculation unit 271 of the battery ECU 27 calculates the SOC of the high-voltage battery 23. In next step S58, the battery ECU 27 determines whether or not the calculated SOC exceeds a second reference SOC2. In a case where the determination in step S58 is NO, the process returns to S57, and the battery ECU 27 causes electricity generation to be continued. In a case where the determination in step S58 is YES, the process progresses to S59. In step S59, the battery ECU 27 assumes that charging for the high-voltage battery 23 is completed and outputs an end of electricity generation to each of the engine ECU 25 and the motor ECU 26 through the CAN communication line 28.

The right flowchart in FIG. 4 illustrates a control procedure of the generator motor 12 in electricity generation, the control procedure being executed by the generator motor control unit 261 of the motor ECU 26. First, in step S510 after a start, the generator motor control unit 261 determines whether or not electricity generation by the electricity generation request from the battery ECU 27 is being performed. In a case where electricity generation is not being performed, step S510 is repeated in the process, but in a case where electricity generation is being performed, the process progresses to S511.

In step S511, the generator motor control unit 261 reads the target electricity generation amount calculated by the battery ECU 27, and in next step S512, the generator motor control unit 261 sets an operating point of the generator motor 12 based on the target electricity generation amount. Further, in step S513, the generator motor control unit 261 controls the second inverter 22 such that the generator motor 12 acts at the set operating point.

In step S514, the generator motor control unit 261 determines whether or not an instruction to stop electricity generation is made. While no instruction to stop electricity generation is made, step S514 is repeated in the process. The generator motor 12 continues electricity generation driving. When the instruction to stop electricity generation is made, the process progresses to step S515. In step S515, the generator motor control unit 261 stops inverter control.

Figure 5:
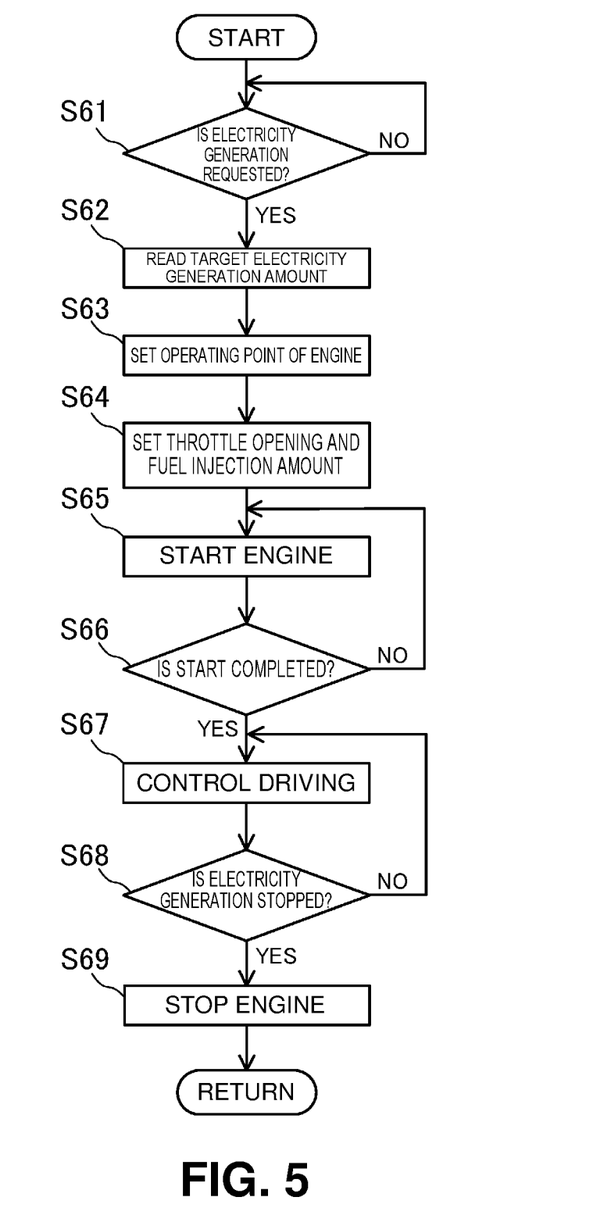
FIG. 5 illustrates an example procedure of engine control.

FIG. 5 illustrates a control procedure of the rotary engine 3 which is executed by the engine ECU 25. First, in step S61 after a start, the engine ECU 25 determines whether or not the electricity generation request from the battery ECU 27 is made. In a case where the electricity generation request is not made, step S61 is repeated in the process, but in a case where the electricity generation request is made, the process progresses to S62.

In step S62, the engine ECU 25 reads the target electricity generation amount calculated by the battery ECU 27, and in next step S63, the engine operating point setting unit 251 of the engine ECU 25 sets an operating point of the rotary engine 3 based on the target electricity generation amount. Further, in step S64, the engine control unit 252 of the engine ECU 25 sets an opening of the throttle valve 394 and a fuel injection amount such that the rotary engine 3 is driven at the set operating point.

In step S65, engine start control is executed. This engine start control is executed by using the generator motor 12 as a starter. Consequently, this engine start control is executed by cooperation between the engine ECU 25 and the motor ECU 26 as described later.

In step S66, the engine ECU 25 determines whether or not a start of the rotary engine 3 is completed. In a case where the start is not completed, the process returns to step S65, but in a case where the start is completed, the process progresses to S67.

In step S67, the engine control unit 252 of the engine ECU 25 causes the rotary engine 3 to be driven at the set operating point. In next step S68, the engine ECU 25 determines whether or not an instruction to stop electricity generation is made. While no instruction to stop electricity generation is made, the process returns to step S67, and the engine control unit 252 continues driving of the rotary engine 3. When the instruction to stop electricity generation is made, the process progresses from step S68 to step S69. In step S69, the engine ECU 25 stops the rotary engine 3.

Control of Assist Motor

Figure 6:
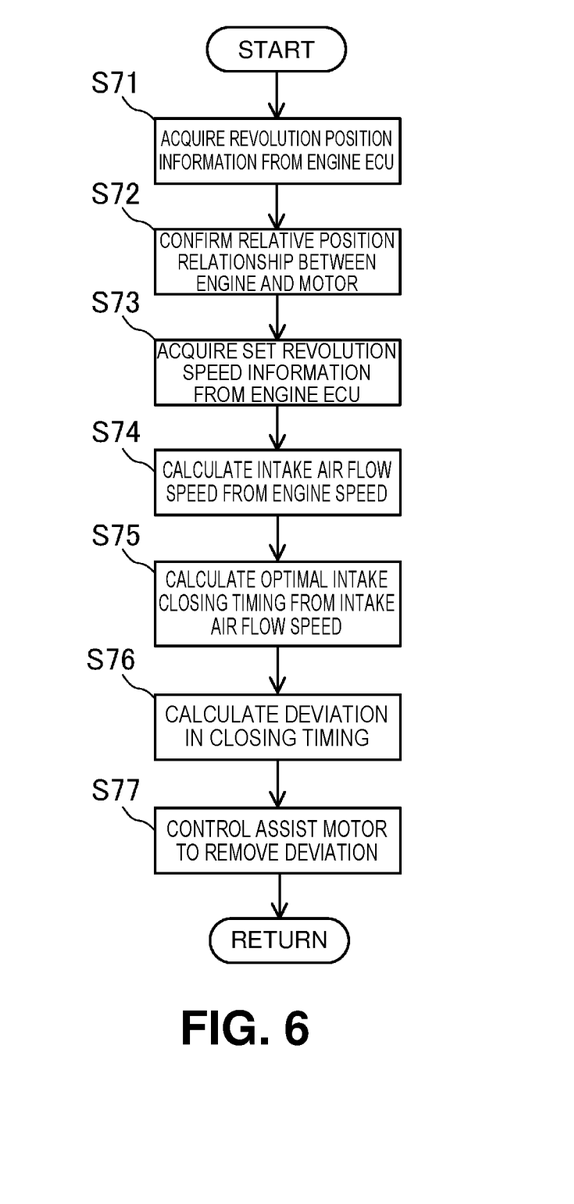
FIG. 6 illustrates an example control procedure of an assist motor.

FIG. 6 illustrates a control procedure of the assist motor 15 which is executed by the assist motor control unit 263 of the motor ECU 26. In step S71, the motor ECU 26 obtains revolution position information of the rotary engine 3 from the engine ECU 25. In step S72, the motor ECU 26 confirms the relative position relationship between the revolution position of the rotary engine 3 and the rotation position of the generator motor 12.

In next step S73, the motor ECU 26 acquires set revolution speed information of the rotary engine 3 from the engine ECU 25. In step S74, the motor ECU 26 calculates an intake air flow speed of the rotary engine 3 from the acquired set revolution speed information. Note that the intake air flow speed is proportional to the revolution speed of the rotary engine 3, the intake air flow speed becomes higher as the revolution speed becomes higher, and the intake air flow speed becomes lower as the revolution speed becomes lower.

In step S75, the motor ECU 26 calculates an optimal intake closing timing from the calculated intake air flow speed. The optimal intake closing timing mentioned here may be a closing timing at which the intake air charging efficiency becomes a maximum.

In step S76, the motor ECU 26 calculates a deviation between the optimal closing timing calculated in step S75 and the intake closing timing of the rotary engine 3 driven at the set revolution speed. The intake closing timing of the rotary engine 3 driven at the set revolution speed is the intake closing timing of the rotary engine 3 in a case where no torque is applied by the assist motor 15.

In a case where a deviation in the intake closing timing is present, the rotary engine 3 is driven in a revolution speed region other than a specific revolution speed region in which the intake closing timing becomes optimal. As described above, the specific revolution speed region is a highest use revolution speed region of the rotary engine 3 or a revolution speed region in which the use frequency is highest.

Then, in step S77, the motor ECU 26 controls the assist motor 15 so as to remove the deviation based on the deviation calculated in step S76. In other words, in a case where the intake closing timing of the rotary engine 3 is later than the optimal closing timing, the assist motor 15 performs power running and thereby temporarily applies a positive torque to the rotary engine 3 in the intake stroke. Accordingly, the revolution rate of the rotary engine 3 is temporarily made higher, and the intake closing timing of the engine 3 is made earlier. Further, in a case where the intake closing timing of the rotary engine 3 is earlier than the optimal closing timing, the assist motor 15 performs electricity generation driving and thereby temporarily applies a negative torque to the rotary engine 3 in the intake stroke. Accordingly, the revolution rate of the rotary engine 3 is temporarily made lower, and the intake closing timing of the engine 3 is made later.

FIG. 3 illustrates, as an example, assist timings of the assist motor 15. As described above, the motor ECU 26 controls the assist motor 15 such that a torque is temporarily applied to the rotary engine 3 in the intake stroke. In the example in FIG. 3, in a case where the intake stroke is divided into three equivalent parts as three periods of an early period, an intermediate period, and a late period, a torque of the assist motor 15 is applied to the rotary engine 3 in the late period. Note that there can be both cases where this torque is a positive torque and where this torque is a negative torque. As for an assist torque, because the assist torque is temporarily applied to the rotary engine 3, the revolution speed of the rotary engine 3 is not changed by the assist torque, and the intake air flow speed is not changed by the assist torque either.

When the assist torque is applied in the late period of the intake stroke, the closing timing of the intake port 391 is changed in the late period of the intake stroke. In particular, in a case where a positive torque is applied to the rotary engine 3 in the late period of the intake stroke, the intake air flow speed is locally increased, and this provides an advantage in an improvement in the intake air charging efficiency. Note that application of the assist torque by the assist motor 15 is not limited to the late period of the intake stroke. The assist torque may be applied to the rotary engine 3 in the early period or the intermediate period of the intake stroke.

The rotary engine 3 is different from a reciprocating engine and there is difficulty in including a variable valve timing mechanism due to its structure. The rotary engine 3 cannot optimize intake air charging efficiency by using a variable valve timing mechanism.

However, this system can change the intake closing timing of the rotary engine 3 by using the assist motor 15. This system can maximize the intake air charging efficiency by changing the intake closing timing through a wide revolution speed region regardless of the revolution speed of the rotary engine 3. This system improves fuel efficiency performance of the rotary engine 3 in the electric vehicle 1 in which the range extender device 30 is installed.

Note that because the rotary engine 3 is an engine for electricity generation and does not produce motive power for traveling of the electric vehicle 1, a change in the revolution rate of the rotary engine 3 in the intake stroke is permitted.

Modifications of Torque Assist Control

In the control procedure in FIG. 6, the motor ECU 26 calculates the deviation between the optimal intake closing timing and an actual intake closing timing based on the intake air flow speed calculated from an engine speed and thereby controls the assist motor 15. Instead of this, the motor ECU 26 may control the assist motor 15 by using a control map.

Figure 7A:
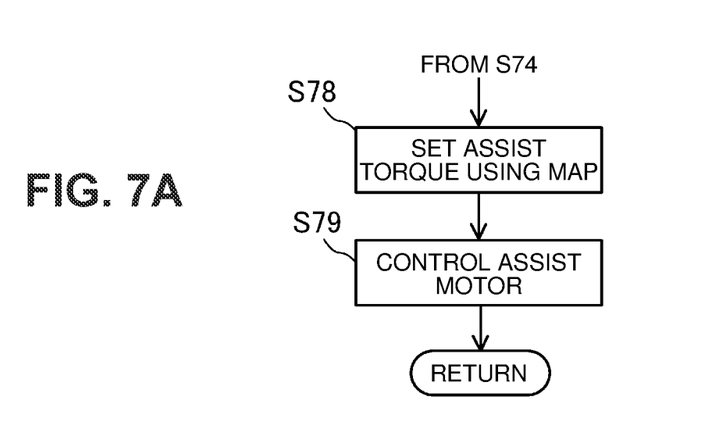
FIG. 7A illustrates a modification of the control procedure of the assist motor.

FIG. 7A illustrates, as an example, steps which replace steps S74 to S77 in the flow in FIG. 6. As described above, when the motor ECU 26 acquires revolution speed information of the rotary engine 3 in step S73, the motor ECU 26 sets the assist torque by using the revolution speed information and the control map.

Figure 7B:
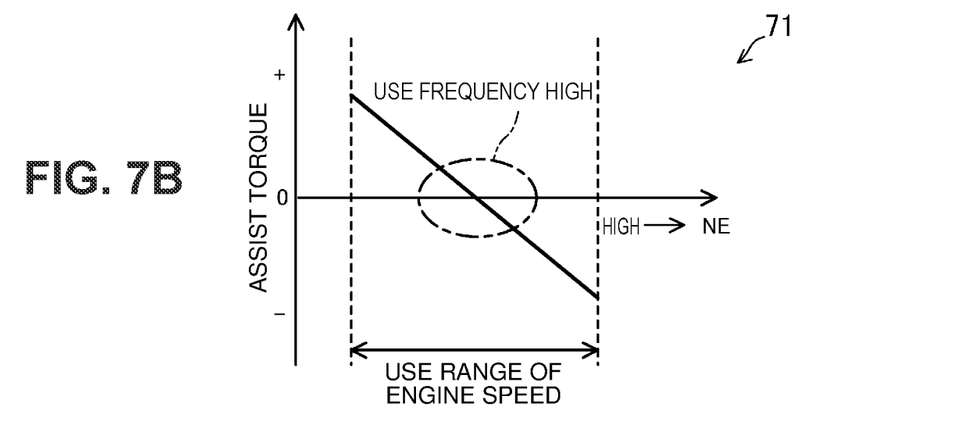
FIGS. 7B and 7C illustrate example maps for control.

FIG. 7B illustrates one example of the control map. This control map 71 defines the relationship between the engine speed and the assist torque. In the control map 71, the intake closing timing of the rotary engine 3 is set such that the intake air charging efficiency becomes a maximum in the revolution speed region in which the use frequency of the rotary engine 3 is highest. In the control map 71, the revolution speed region in which the use frequency of the rotary engine 3 is highest is a part around the center in a use revolution speed range of the engine, and here, the assist torque is zero. In order to make the intake closing timing earlier when the revolution speed of the rotary engine 3 becomes lower than the revolution speed region in which the use frequency is highest, the assist torque is set to a positive torque. In order to make the intake closing timing later when the revolution speed becomes higher than the revolution speed region in which the use frequency is highest, the assist torque is set to a negative torque.

Figure 7C:
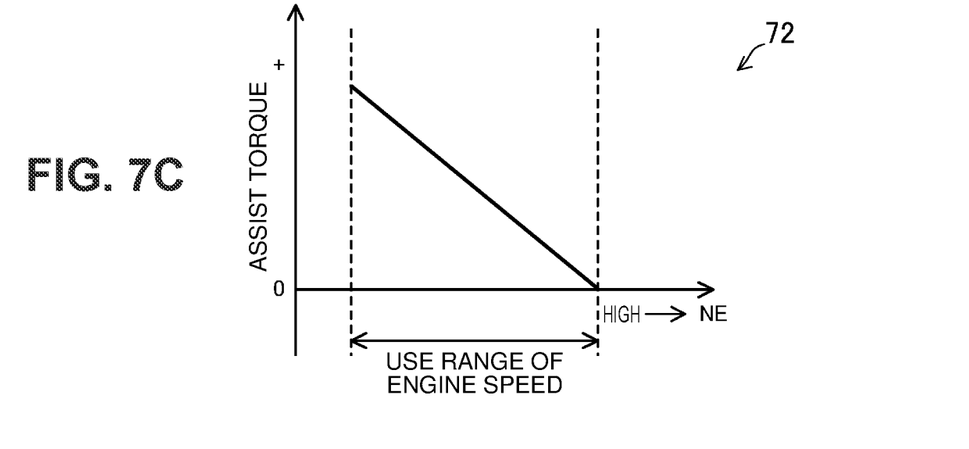

FIG. 7C illustrates another example of the control map. In this control map 72, the intake closing timing of the rotary engine 3 is set such that the intake air charging efficiency becomes a maximum in the highest use revolution speed region of the rotary engine 3. In the control map 72, in the highest use revolution speed region of the rotary engine 3, the assist torque is zero. In order to make the intake closing timing earlier when the revolution speed becomes lower, the assist torque is set to a positive torque. In this control map 72, the assist torque is not set to a negative torque.

Note that in the control maps 71 and 72 illustrated as examples in FIGS. 7B and 7C, the assist torque is proportional to the revolution speed of the rotary engine 3. A control map is not limited to a map having such a proportional relationship.

When the assist torque is set from the revolution speed of the rotary engine 3 by using the control map 71 or a control map 772, in step S79, the motor ECU 26 controls the assist motor 15 in accordance with the set assist torque. Accordingly, similarly to the above, the intake closing timing is optimized, and the fuel efficiency performance of the rotary engine 3 becomes good.

Modification of Electric Vehicle

Figure 8:
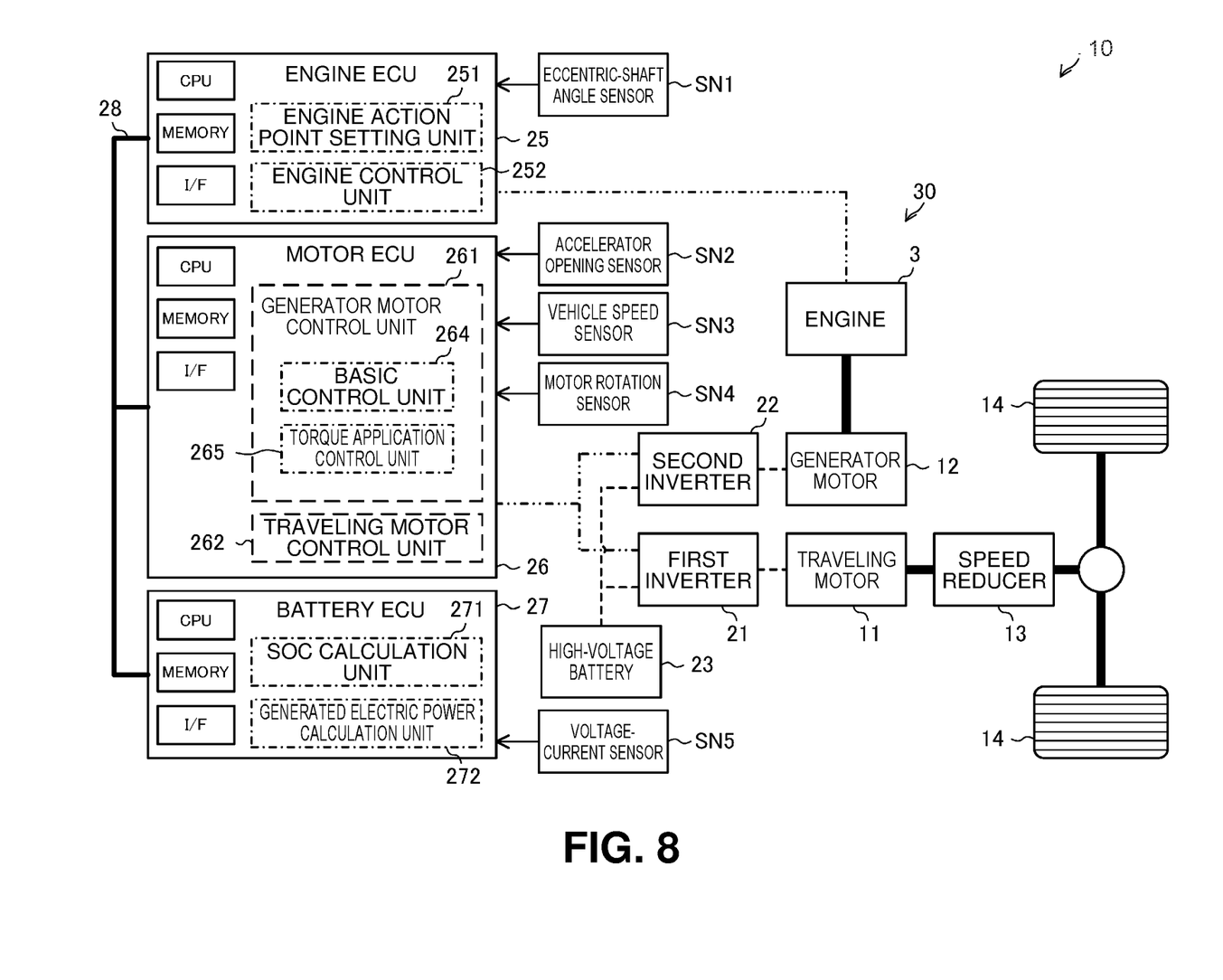
FIG. 8 illustrates an example control system of an electric vehicle.

FIG. 8 illustrates a modification of the electric vehicle disclosed herein above. In the following, changed parts in an electric vehicle 10 will be described.

The electric vehicle 10 of this embodiment does not include the assist motor 15 or the third inverter 24. Further, the motor ECU 26 has, as function blocks, the generator motor control unit 261 and the traveling motor control unit 262. Further, the generator motor control unit 261 has a basic control unit 264 and a torque application control unit 265. The basic control unit 264 executes basic control related to electricity generation driving and power running of the generator motor 12. The torque application control unit 265 controls the generator motor 12 so as to change the torque to be applied to the rotary engine 3 in electricity generation. In the electric vehicle 10, instead of the assist motor 15, the generator motor 12 adjusts the intake closing timing of the rotary engine 3.

Figure 9:
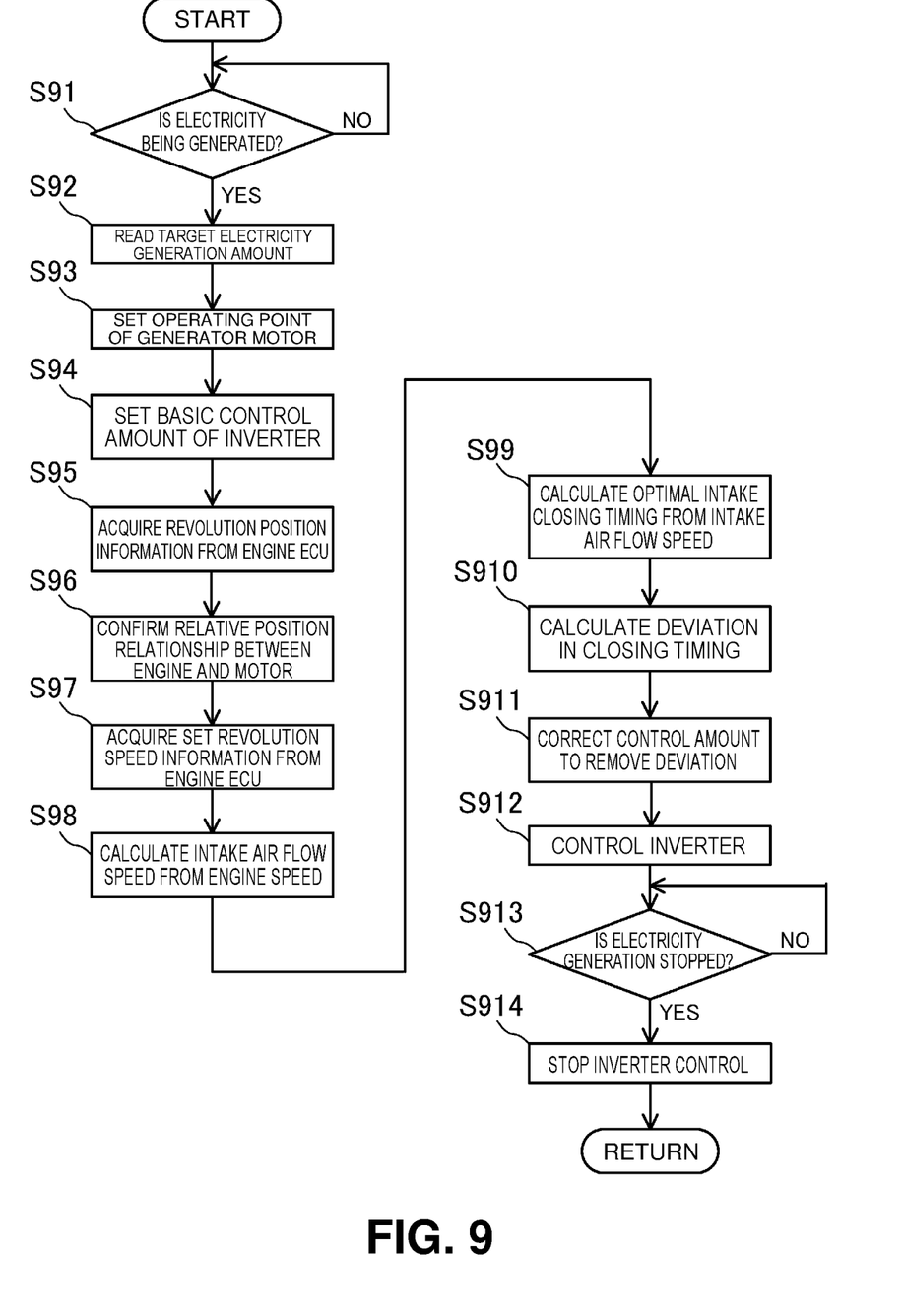
FIG. 9 illustrates an example procedure of motor control.

FIG. 9 illustrates a motor control procedure of the electric vehicle 10. First, in step S91 after a start, the motor ECU 26 determines whether or not electricity generation by an electricity generation request from the battery ECU 27 is being performed. In a case where electricity generation is not being performed, step S91 is repeated in the process, but in a case where electricity generation is being performed, the process progresses to S92.

In step S92, the motor ECU 26 reads a target electricity generation amount calculated by the battery ECU 27, and in next step S93, the motor ECU 26 sets an operating point of the generator motor 12 based on the target electricity generation amount. Further, in step S94, the basic control unit 264 of the motor ECU 26 controls a basic control amount of the second inverter 22 such that the generator motor 12 acts at the set operating point.

In step S95, the motor ECU 26 obtains revolution position information of the rotary engine 3 from the engine ECU 25. In step S96, the motor ECU 26 confirms the relative position relationship between the revolution position of the rotary engine 3 and the rotation position of the generator motor 12.

In next step S97, the motor ECU 26 acquires set revolution speed information of the rotary engine 3 from the engine ECU 25. In step S98, the motor ECU 26 calculates an intake air flow speed of the rotary engine 3 from the acquired set revolution speed information.

In step S99, the motor ECU 26 calculates an optimal intake closing timing from the calculated intake air flow speed. The optimal intake closing timing mentioned here may be a closing timing at which the intake air charging efficiency becomes a maximum.

In step S910, the motor ECU 26 calculates a deviation between the optimal closing timing calculated in step S99 and the intake closing timing of the rotary engine 3 in a case where no torque is applied by the assist motor 15.

In a case where a deviation in the intake closing timing is present, the rotary engine 3 is driven in a revolution speed region other than a specific revolution speed region in which the intake closing timing becomes optimal. In the electric vehicle 10 in the modification, the specific revolution speed region is a highest use revolution speed region of the rotary engine 3.

Then, in step S911, the motor ECU 26 corrects a control amount of the generator motor 12 so as to remove the deviation based on the deviation calculated in step S910. In other words, because the intake closing timing is set to the optimal closing timing in the highest use revolution speed region of the rotary engine 3, a deviation in the intake closing timing occurs to a later side than the optimal closing timing.

The rotary engine 3 in electricity generation drives the generator motor 12 by applying a positive torque to the generator motor 12. In other words, to the rotary engine 3 in electricity generation, the negative torque corresponding to the electricity generation amount of the generator motor 12 is applied. As the electricity generation amount becomes larger, the negative torque becomes higher. When a motor ECU 261 temporarily lowers the electricity generation amount of the generator motor 12, the negative torque applied to the rotary engine 3 lowers, the revolution rate of the rotary engine 3 thus temporarily becomes higher, and the intake closing timing of the engine 3 becomes earlier. This is equivalent to the fact that the generator motor 12 temporarily applies a positive torque to the rotary engine 3. Note that in a case where no deviation in the closing timing is present, step S911 is skipped.

Figure 10:
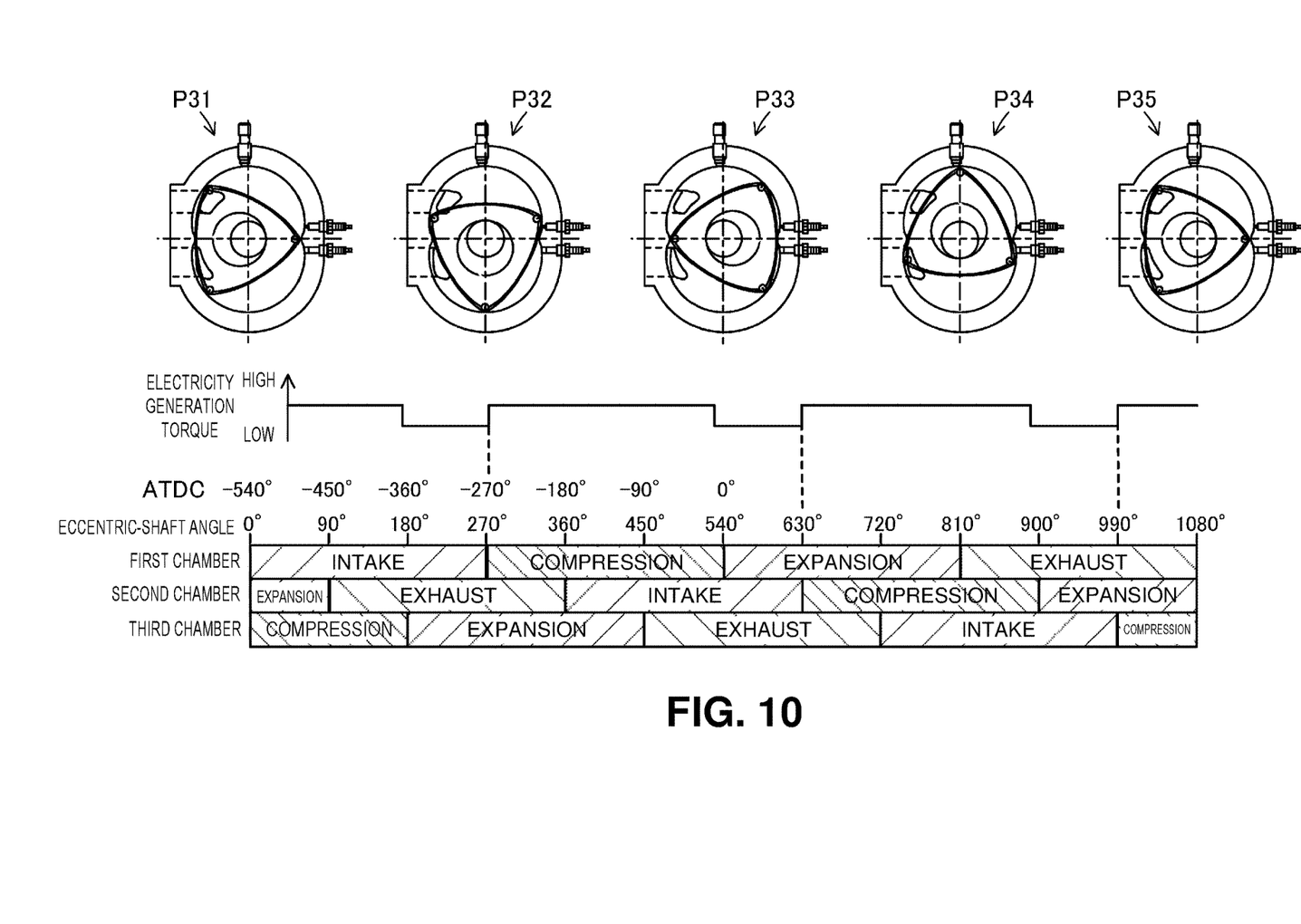
FIG. 10 illustrates an example timing chart about the motor control.

FIG. 10 is a timing chart illustrating, as an example, fluctuation timings of a torque needed for electricity generation by the generator motor 12. The motor ECU 26 controls the electricity generation amount of the generator motor 12 such that an electricity generation torque to be applied to the rotary engine 3 in the intake stroke is temporarily lowered. In the example in FIG. 3, in a case where the intake stroke is divided into three equivalent parts as three periods of an early period, an intermediate period, and a late period, the electricity generation torque lowers in the late period.

When the electricity generation torque lowers in the late period of the intake stroke, the closing timing of the intake port 391 becomes earlier in the late period of the intake stroke. Accordingly, the intake closing timing is optimized. Further, the intake air flow speed is locally increased, and this provides an advantage in an improvement in the intake air charging efficiency.

Note that lowering the electricity generation torque is not limited to the late period of the intake stroke. The electricity generation torque may be lowered in the early period or the intermediate period of the intake stroke.

The electric vehicle 10 in the modification can also maximize the intake air charging efficiency through a wide revolution speed region regardless of the revolution speed of the rotary engine 3. This system also improves fuel efficiency performance in the electric vehicle 10 in which the range extender device 30 is installed.

Returning to the flow in FIG. 9, in step S912, the motor ECU 26 controls the second inverter 22 based on the corrected basic control amount and causes the generator motor 12 to execute electricity generation. Then, in step S913, the motor ECU 26 determines whether or not an instruction to stop electricity generation is made. While no instruction to stop electricity generation is made, step S913 is repeated in the process. The generator motor 12 continues electricity generation driving. When the instruction to stop electricity generation is made, the process progresses to step S914. In step S914, the motor ECU 26 stops inverter control.

The electric vehicle 10 according to the modification has an advantage of being capable of omitting the assist motor 15.

Note that in the electric vehicle 10, by using a control map which defines the relationship between the revolution speed of the rotary engine 3 and a correction amount of the basic control amount, the motor ECU 26 may control electricity generation by the generator motor 12.

In each of the above-described flows, order of steps is not necessarily defined. In the possible range, order of steps can be altered, and processes of plural steps can simultaneously be executed. Further, in each of the flows, a part of steps can be omitted, and steps can also be added.

Further, the systems illustrated in FIG. 1 and FIG. 10 are examples, and a system to which the technique disclosed herein is applicable is not limited to the systems in FIG. 1 or FIG. 10. Further, the technique disclosed herein is capable of being widely applied to a control system of a rotary engine, and a structure of a rotary engine is not limited to the structure in FIG. 2.

Further, a reciprocating engine as an internal combustion engine may be installed in the electric vehicle 1. The technique disclosed herein can be used for a change in an intake closing timing of a reciprocating engine.

What is claimed is:

1. A control apparatus for an electric vehicle, the control apparatus comprising:
    an engine which is for electricity generation and in which a closing timing of an intake port is set such that intake air charging efficiency becomes a maximum in a specific revolution speed region;
    a sensor which outputs an electric signal related to a revolution speed of the engine;
    a controller which drives the engine at a revolution speed based on the electric signal of the sensor, a requested electricity generation amount being satisfied at the revolution speed; and
    a motor which applies a positive torque or a negative torque to the engine, wherein
    when the engine is driven in a revolution speed region other than the specific revolution speed region, the controller uses the motor to apply a positive torque or a negative torque to the engine in an intake stroke such that the closing timing of the intake port is changed in a direction in which the intake air charging efficiency becomes high.

2. The control apparatus for an electric vehicle according to claim 1, wherein
    the motor is an assist motor which is connected with a shaft of the engine, and
    the controller uses the assist motor to apply a positive torque or a negative torque to the engine in the intake stroke.

3. The control apparatus for an electric vehicle according to claim 1, wherein
    the motor is a generator motor which is mechanically connected with the engine and is driven by the engine, and
    the controller causes the generator motor to perform electricity generation driving such that a torque lower than an electricity generation torque corresponding to the requested electricity generation amount is applied to the engine in the intake stroke.

4. The control apparatus for an electric vehicle according to claim 3, wherein
    the closing timing of the intake port is a timing at which the intake air charging efficiency becomes a maximum at a highest use revolution speed of the engine.

5. The control apparatus for an electric vehicle according to claim 2, wherein
    the closing timing of the intake port is a timing at which the intake air charging efficiency becomes a maximum in a revolution speed region in which a use frequency of the engine is highest.

6. The control apparatus for an electric vehicle according to claim 1, wherein
the closing timing of the intake port is a timing at which the intake air charging efficiency becomes a maximum at a highest use revolution speed of the engine.

7. The control apparatus for an electric vehicle according to claim 2, wherein
the closing timing of the intake port is a timing at which the intake air charging efficiency becomes a maximum at a highest use revolution speed of the engine.

8. The control apparatus for an electric vehicle according to claim 1, wherein
the closing timing of the intake port is a timing at which the intake air charging efficiency becomes a maximum in a revolution speed region in which a use frequency of the engine is highest.

* * * * *